United States Patent [19]
Venkateshwaran et al.

[11] Patent Number: 6,072,857
[45] Date of Patent: Jun. 6, 2000

[54] METHODS AND SYSTEM FOR MONITORING THE OPERATIONAL STATUS OF A NETWORK COMPONENT IN AN ADVANCED INTELLIGENT NETWORK

[75] Inventors: M. S. Venkateshwaran, Duluth; Jim H. Chan, Roswell; Susan Beth Price, Atlanta, all of Ga.

[73] Assignee: Bellsouth Intellectual Property Management Corporation, Atlanta, Ga.

[21] Appl. No.: 08/769,932

[22] Filed: Dec. 19, 1996

[51] Int. Cl.⁷ .............................. H04M 3/00; H04M 1/24
[52] U.S. Cl. .................. 379/9; 379/10; 379/230; 379/229; 379/2; 379/265
[58] Field of Search .................. 379/9, 10, 13, 379/15, 18, 1, 2, 8, 14, 26, 34, 16, 28, 201, 229, 230, 211, 212, 265, 266, 221, 21, 112, 113

[56] References Cited

U.S. PATENT DOCUMENTS

| | | | |
|---|---|---|---|
| 5,084,816 | 1/1992 | Boese et al. | 395/575 |
| 5,367,562 | 11/1994 | Tourbah et al. | 379/93 |
| 5,379,383 | 1/1995 | Yunoki . | |
| 5,386,467 | 1/1995 | Ahmad | 379/220 |
| 5,430,719 | 7/1995 | Weisser et al. | 379/95 |
| 5,438,568 | 8/1995 | Weisser, Jr. | 379/96 |
| 5,469,503 | 11/1995 | Butensky et al. | 379/265 |
| 5,572,581 | 11/1996 | Sattar et al. | 379/201 |
| 5,638,431 | 6/1997 | Everett et al. | 379/115 |
| 5,644,631 | 7/1997 | Sattar et al. | 379/201 |
| 5,680,437 | 10/1997 | Segal | 379/10 |
| 5,701,301 | 12/1997 | Weisser, Jr. | 379/95 |
| 5,703,940 | 12/1997 | Sattar et al. | 379/201 |
| 5,737,404 | 4/1998 | Segal | 379/230 |
| 5,754,784 | 5/1998 | Garland et al. | 379/101.01 |
| 5,802,164 | 9/1998 | Clancy et al. | 379/220 |
| 5,848,128 | 12/1998 | Frey | 379/9 |
| 5,878,130 | 3/1999 | Andrews et al. | 379/265 |
| 5,883,939 | 3/1999 | Friedman et al. | 379/9 |

FOREIGN PATENT DOCUMENTS

| | | |
|---|---|---|
| 0687096A2 | 12/1995 | European Pat. Off. . |
| WO95/32571 | 11/1995 | WIPO . |
| WO96/16515 | 5/1996 | WIPO . |
| WO96/16516 | 5/1996 | WIPO . |

OTHER PUBLICATIONS

Bijan Jabarri, Routing and Congestion Control in Common Channel Signaling System No. 7 Proceedings of the IEEE, vol. 80, No. 4, Apr. 1, 1992.

Chin Wang Chao, et al., FASTAR Platform Gives the Network a Competitive Edge, AT&T Technical Journal, vol. 7, No. 4, Jul. 1, 1992.

*Primary Examiner*—Paul Loomis
*Assistant Examiner*—Rexford N. Barnie
*Attorney, Agent, or Firm*—Jones & Askew, LLP

[57] ABSTRACT

A method and system for monitoring the operational status of a network element in an advanced intelligent network is provided. Custom telecommunications services, such as a call forwarding service, are processed by routing a call to a network element, such as a service circuit node, that processes the call and provides the custom telecommunications service. When the network element or application software resident at that network element fails, calls routed to that network element may be mishandled. The method and system of the present invention utilize advanced intelligent network services to monitor a desired network element prior to routing a call to that network element for custom telecommunications service. A heartbeat message is utilized between a monitored network element and a monitoring network element. The method and system reduce network element downtime by alerting maintenance personnel of network element or application software failure.

11 Claims, 4 Drawing Sheets

METHODS AND SYSTEM FOR MONITORING THE OPERATIONAL STATUS OF A NETWORK COMPONENT IN AN ADVANCED INTELLIGENT NETWORK

FIELD OF THE INVENTION

This invention relates in general to telecommunications and more particularly to a method and a system for using a heartbeat message in an advanced intelligent network for monitoring the operational status of a network element.

BACKGROUND OF THE INVENTION

In recent years, the demand for telecommunications services by businesses and individuals has increased dramatically. That dramatic increase has led to a corresponding increase in the demand for specialized and custom call processing features such as call forwarding, call waiting, call holding, audio calling name, and call answering services.

Some telecommunications networks, and particularly some advanced intelligent network (AIN) based telecommunications services, require the interaction and cooperation of application software on one or more distributed network elements in order to provide custom services. In order to process custom services, such as call forwarding, most present telecommunications networks utilize application software at some network element tasked with providing the desired custom calling feature. For example, calls that require forwarding under a call forwarding service may be routed to a particular network element containing a call forwarding application software. That network element, and particularly the application software resident at the network element, processes the call according to the custom feature ordered by the subscriber of the custom service. For example, if Ms. Price has ordered that all calls directed to her home telephone directory number be temporarily directed to Mr. Chan's home telephone directory number, a call directed to Ms. Price's home telephone directory number by Mr. Ven will be routed to a network element tasked with processing calls requiring call forwarding treatment. That network element will provide the necessary processing and route the call to the alternate telephone directory number ordered by the subscriber, Ms. Price.

A problem occurs, however, when the network element or application software tasked with providing the custom calling feature is out of service. Hardware at the network element may malfunction or may be manually shut down for preventive maintenance. Similarly, the application software resident in the network element may develop problems that limits its ability to process the custom service. When such a failure of the network element or application software occurs, often the call requiring custom treatment is lost altogether. By way of illustration, if the network element or application software tasked with handling the call forwarding example discussed above goes out of service, the call will still be routed to the network element, but will not be processed. The result may be that the call placed by Mr. Ven will literally ring until Mr. Ven terminates the call. Consequently, Ms. Price will not have been reached either at the desired alternate telephone directory number or at her home telephone directory number.

There is no known method or system in the prior art for causing one network element to monitor the operational status of a second network element prior to allowing a call to be routed to the second network element for call processing or custom treatment. Likewise, there is no known method or system in the prior art of causing a particular application software resident at one network element to monitor associated application software resident at a second network element. There is a need in the art for a method and system for having one network element monitor the operational status of another network element or elements. Accordingly, there is a need for a method and system for efficiently and inexpensively using advanced intelligent network services to monitor a network element or application software resident at a network element prior to routing a call to that network element or application software to provide some customized call treatment prior to call completion.

SUMMARY OF THE INVENTION

The present invention satisfies the above described needs by providing a method and system for monitoring the operational status of network elements of an advanced intelligent network. The preferred method and system of the present invention utilize messages to a first network element from a second network element to allow the first network element to monitor the operational status of the second network element. Thus, the present invention provides for the efficient use of network elements and prevents unnecessary forwarding of calls to non-operational network elements. The method and system reduce network element downtime by alerting maintenance personnel of network element or application software failure.

Stated generally, in an intelligent switched telecommunications network, including a plurality of network elements for processing telephone communications, a method of monitoring the operational status of a network element prior to routing a call to that network element for custom service is provided, comprising the steps of receiving a call at a switch; causing the switch to route identification information corresponding to the call to a first network element; and causing the first network element, in response to receipt of the identification information, to determine whether the call requires custom service from a second network element. If the first network element determines that the call requires custom service from the second network element, then the method causes the first network element to determine whether the second network element is operational. If the first network element determines the second network element is operational, then the method causes the first network element to provide instructions to the switch to route the call to the second network element for receipt of the custom service. Preferably, if the first network element determines the second network element is not operational, then the method causes the first network element to provide instructions to the switch to route the call around the second network element to a default destination.

Preferably, the method of the present invention further comprises the steps of causing the second network element to send a message to the first network element and receiving the message at the first network element from the second network element. Preferably, the message is a heartbeat message, and the step of receiving a message at a first network element from a second network element, further comprises receiving the heartbeat message at the first network element from the second network element.

In response to receipt of the message, the method preferably causes the first network element to determine whether the second network element is operational, and if the first network element determines the second network element is operational, then the method causes the first network element to designate the second network element as operational. If the first network element determines the second network element is operational, then the method causes the first network element to designate the second network element as "in service." If the first network element determines the second network element is not operational, then the method may cause the first network element to designate the second network element as "out of service."

In the preferred embodiment of the present invention, the first network element is an advanced intelligent network (AIN) service control point, and the step of causing the first network element, in response to receipt of the message, to determine whether the second network element is operational, further comprises causing the AIN service control point to determine whether the second network element is operational. The second network element preferably is an advanced intelligent network (AIN) service circuit node, and the step of causing the AIN service control point to determine whether the second network element is operational, further comprises causing the AIN service control point to determine whether the AIN service circuit node is operational.

The second network element may be an automatic call distributor, and the step of causing the AIN service control point to determine whether the second network element is operational may comprise causing the AIN service control point to determine whether the automatic call distributor is operational. Alternatively, the second network element may be a private branch exchange, and the step of causing the AIN service control point to determine whether the second network element is operational may comprise causing the AIN service control point to determine whether the private branch exchange is operational.

In another aspect of the present invention, in an intelligent switched telecommunications network, including a plurality of network elements for processing telephone communications, a method of monitoring the operational status of a network element, is provided comprising the steps of receiving a message at a first network element from a second network element; causing the first network element, in response to receipt of the message, to determine whether the second network element is operational; and if the first network element determines the second network element is operational, then causing the first network element to designate the second network element as operational. In response to the first network element designating the second network element as operational, the method causes the first network element to cause a telephone communication requiring processing by the second network element to be routed to the second network element for processing.

In another aspect of the present invention, in an intelligent switched telecommunications network, including a plurality of network elements for processing telephone communications, a system of monitoring the operational status of a network element prior to routing a call to that network element for custom service is provided, comprising a first network element and a second network element functionally connected to the first network element, where the second network element is operative to send a message to the first network element. The first network element is operative to receive the message from the second network element, and in response to receipt of the message, to determine whether the second network element is operational.

In another aspect of the present invention, in an intelligent switched telecommunications network, including a plurality of network elements for processing telephone communications, a system of monitoring the operational status of a network element prior to routing a call to that network element for custom service is provided, comprising a switch operative to receive a call and a first network element being functionally connected to the switch and to a second network element. The first network element is operative to receive identification information corresponding to the call, to determine whether the call should receive custom service from the second network element, to determine whether the second network element is operational, and to provide instructions to the switch to route the call to the second network element if the first network element determines the second network element is operational. The switch is further operative to route the call to the second network element, and the second network element being operative to provide custom service to the call.

Preferably, the second network element is further operative to send a message to the first network. The first network element is further operative to receive the message from the second network element and to determine from the message whether the second network element is operational.

In the preferred form of this aspect of the present invention, the first network element is an advanced intelligent network (AIN) service control point, and the second network element is an advanced intelligent network (AIN) service circuit node. The second network element may be an automatic call distributor or a private branch exchange.

Accordingly, it is an object of the present invention to provide and efficient method and system for utilizing advanced intelligent network services for monitoring the operational status of a network element in an advanced intelligent network. This and other objects, features, and advantages of the present invention will become apparent upon review of the following detailed description and the attached drawings.

DETAILED DESCRIPTION

Stated generally, the preferred method and system of the present invention utilizes advanced intelligent network (AIN) services to monitor the operational status of a network element. As is discussed below, the present invention preferably allows for the efficient utilization of intelligent network elements by verifying the operational status of a desired intelligent network element or of a particular application software resident at a desired intelligent network element prior to routing a call to that intelligent network element or application software. If a first intelligent network element tasked with monitoring the operational status of a second intelligent network element determines that the second intelligent network element is not operational, the first intelligent network element routes a call around the non-operational second intelligent element to a predetermined destination, thus preventing the call from being routed erroneously to the non-operational second intelligent network element.

DESCRIPTION OF THE PREFERRED ENVIRONMENT FOR THE PRESENT INVENTION

The modern public switched telephone network (PSTN) forms the basic environment of the present invention. The modern public switched telephone network has separate signaling paths for voice signals (or other customer-utilized communication circuits) and for control signals. Control signals include information transmitted throughout the network to control the connection and disconnection of the voice circuits.

Figure 1:
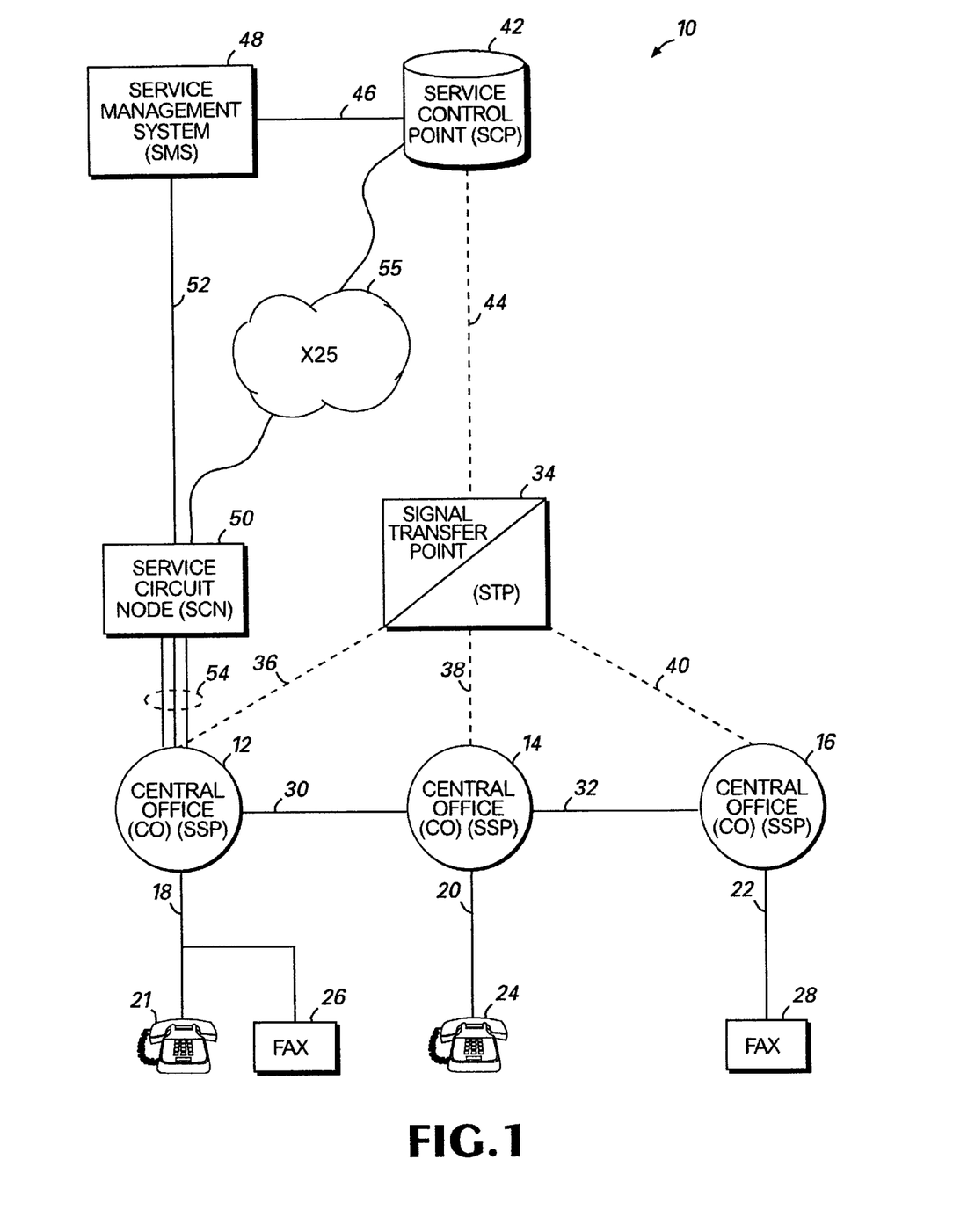
FIG. 1 is a block diagram of a portion of an advanced intelligent network (AIN) in a telephone system that forms the environment for the preferred embodiment of the present invention.

FIG. 1 is a block diagram representing at least a part of the advanced intelligent network (AIN) 10 of a typical local exchange carrier. The advanced intelligent network uses the signaling system 7 (SS7) network for signal or system control message transport. The elements thereof are well known to those skilled in the art. The operation of many of the elements of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

Referring still to FIG. 1, a plurality of central offices is provided in a typical public switched telephone network. As shown in FIG. 1, each central office may include an electronic switch known to those skilled in the art as a service switching point (SSP). These are indicated in FIG. 1 as SSP switches 12, 14, and 16. The number of SSP switches depends on the number of subscribers to be served by the public switched telephone network. An SSP (specifically, a Class 5 central office switch) is the AIN element of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as lines 30 and 32.

As shown in FIG. 1, central offices switches (SSP) 12, 14, and 16 have a plurality of subscriber lines 18, 20, and 22 connected thereto. Each of the subscriber lines 18, 20, and 22 is connected to a terminating piece or pieces of customer premises equipment that are represented by standard telephone sets 21 and 24 and facsimile devices 26 and 28. Terminating equipment may also include a variety of other devices as is well known to those skilled in the art. SSP switches 12, 14, and 16 are connected by a plurality of trunk circuits indicated as 30 and 32 in FIG. 1. These are the voice path trunks that interconnect the central offices 12, 14, and 16 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 1.

Much of the intelligence, and the basis for many of the new enhanced features of the network reside in the local AIN service control point (SCP) 42 that is typically connected to one or more control offices through a signal transfer point 34 via SS7 data link 44. As is known to those skilled in the art, AIN service control points, such as AIN SCP 42, are physically implemented by relatively powerful fault tolerant computers. Among the functions performed by the service control points are maintenance of network data bases used in providing enhanced services. As is readily understood to those skilled in the art, many of the enhanced services performed by the SCP computers are performed via the implementation of application software.

Additional devices for implementing advanced network functions within the AIN 10 are provided by regional STPs (not shown), regional AIN SCPs (not shown), and a service management system (SMS) 48. Both the regional AIN SCPs and the local AIN SCP 42, which represent a plurality of local AIN SCPs distributed throughout the AIN 10, are connected via respective data links to the SMS 48. The SMS 48 provides a centralized platform for remotely provisioning the various AIN SCPs of the AIN 10 so that a coordinated information processing system may be implemented for the AIN 10. The SMS 48 is implemented by a large general purpose computer and interfaces to business offices of the local exchange carrier and interexchange carriers.

The AIN 10 also includes service circuit nodes (SCN) such as service circuit node 50 shown in FIG. 1. Those skilled in the art will be familiar with service circuit nodes, which are physically implemented by the same types of computers that embody the service control point 42. In addition to the computing capability and data base maintenance features, service circuit node 50 uses Integrated Service Digital Network (ISDN) lines and may include Dual Tone Multi Frequency (DTMF) signal recognition devices, tone generation devices, voice synthesis devices and other voice or data resources.

While service circuit nodes 50 are physically quite similar to SCP 42, there are some important differences in the uses to which SCNs are put. Service control points, such as SCP 42, normally implement high volume routing services and 800 number translation and routing. They are also used for maintenance of and providing access to high volume data bases for authorization of billing, such as credit card number validations. In most local exchange carrier networks, service control points are only used for data base look up and routing services that take place prior to the logical completion of the call, i.e., providing a ringing signal to the called subscriber line and ring back to the calling subscriber.

By contrast, service circuit nodes are used principally when some custom feature or service is needed that requires an audio connection to the call or transfer of a significant amount of data to a subscriber over a switched connection during or following a call. As with the SCP computers discussed above, many of the enhanced services performed by the SCN computers are performed via the implementation of application software. As shown in FIG. 1, service circuit nodes 50 are typically connected to one or more (but normally only a few) SSP central office switches via ISDN links shown as lines 54. Thus, services that are implemented during a call (i.e., after completion of ringing or called subscriber pick up) employ the facility of a service circuit node such as service circuit nodes 50.

In operation, the intelligent network elements of the AIN 10, as described above, communicate with each other via digital data messages transmitted over a network of digital signaling links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP central office switches 12, 14, and 16, a relatively small set of triggers are defined at the SSP central office switches for each call.

The message created by a SSP 12 in response to a trigger is known as a "query" message. A query message opens a "transaction" and the SSP generally holds the communication until it receives a reply from an appropriate network element via the network of digital datalinks instructing the SSP 12 to take a certain action. If the SSP 12 receives no instructions within a certain amount of time, the SSP "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP 12 to route the held communication for connection with a terminating station. Query messages, conversation messages, and response messages are standard types of messages defined by the AIN protocol. The details of the AIN protocol are well known to those skilled in the art and will not be further described herein. For more information regarding the AIN protocol, see Bellcore Specification GR-1298-CORE Switching Systems Generic Requirements for AIN, which is incorporated herein by reference.

As shown in FIG. 1, the SCN 50 and the SCP 42 are functionally connected through a SSP. The SCN 50 may be connected to the SCP 42 directly as shown in FIG. 1, via datalink 55. The datalink 55 illustrated in FIG. 1 is an X.25 datalink. The X.25 datalink, as is well known to those skilled in the art, is a type of datalink network which may be used between mainframe computers, mini-computers, microcomputers and a wide variety of other specialized electronic hardware for communication of packet switched data. It should be understood that the datalink between the SCP 42 and the SCN 50 may comprise an SS7 network datalink, a TCP/IP network datalink or a DTMF datalink. As with the X.25 network datalink, those datalinks are well known to those skilled in the art.

In the preferred embodiment of the present invention, the communications links between network elements such as the X.25 datalink 55, shown in FIG. 1, between the SCN 50 and the SCP 42, are utilized to allow a first network element such as the SCP 42 to monitor the status of a second network element such as the SCN 50. By monitoring the SCN 50, the SCP 42 may determine whether the SCN 50 is operational prior to having a call routed to the SCN 50 for providing some custom service. By monitoring the status of a network element such as SCN 50, the overall reliability and efficiency of the AIN 10 is increased because calls will not be needlessly routed to network elements which are out of service. It should be readily understood that the present invention may be used to monitor a variety of other telecommunications elements, such as a private branch exchange (PBX) or an automatic call distributor (ACD). Those systems are well known to those skilled in the art. As with the SCN 50, monitoring the operational status of an individual PBX or ACD will prevent the unnecessary forwarding of calls to those systems if they are out of service.

An example of a custom feature of service implemented by the service circuit nodes is the call forwarding service. As is well known to those skilled in the art, call forwarding service allows a telecommunications subscriber to direct the provider of his or her telecommunication services to forward calls directed to his or her directory number to an alternate directory number where the subscriber may be reached. As is discussed in detail below, service circuit nodes may be utilized for the implementation of custom services such as the call forwarding service by routing a call to a service circuit node for custom service treatment prior to the ultimate connection of the call to a desired directory number. In the case of the call forwarding service, a call directed to a forwarded number may be routed to a service circuit node which in turn causes the call to be routed to the alternate number designated by the subscriber. Another custom feature implemented by the service circuit nodes is Audio Calling Name service. The Audio Calling Name service is described in U.S. patent application Ser. No. 08/670,803 entitled "A System and Method to Provide An Audio Calling Name Service Implemented Through An Advanced Intelligent Network," filed Jun. 25, 1996, which is incorporated herein by reference.

Preferably, the preferred embodiment of the present invention utilizes a message from one network element to another network element. The preferred message utilized by the present invention is a heartbeat message. As is well known to those skilled in the art, a heartbeat message is a signal quality test function which may be used for self-testing. Preferably, in the present invention, a heartbeat message is used between network elements in the AIN 10 to allow a first network element to monitor the status of a second network element. More particularly, as will be discussed below, a heartbeat message may be utilized by the present invention to allow a specific application software package resident in a first network element to monitor the status of an associated application software package resident in a second network element. Additionally, the heartbeat message may be utilized to monitor the operational status of the datalink between the two network elements, such as the X.25 network datalink 55, shown in FIG. 1. The operational status of the datalink 55 may be monitored by sending heartbeat messages over the datalink (to be monitored) from a second network element with known operational status to a first network element with known operational status. For more information on heartbeat messages, see Institute of Electrical and Electronics Engineers (IEEE) Specification 802.3.

In the preferred embodiment of the present invention, the heartbeat message is utilized from an intelligent network element, such as the service circuit node 50, to another intelligent network element, such as the service control point 42, so that the service control point 42 may monitor the status of the service circuit node 50. As discussed above, monitoring the service circuit node 50 via a heartbeat message allows for efficient utilization of the service circuit node 50 by preventing the routing of calls to the service circuit node 50 when the SCN 50 is out of service.

Figures 3A, 3B:
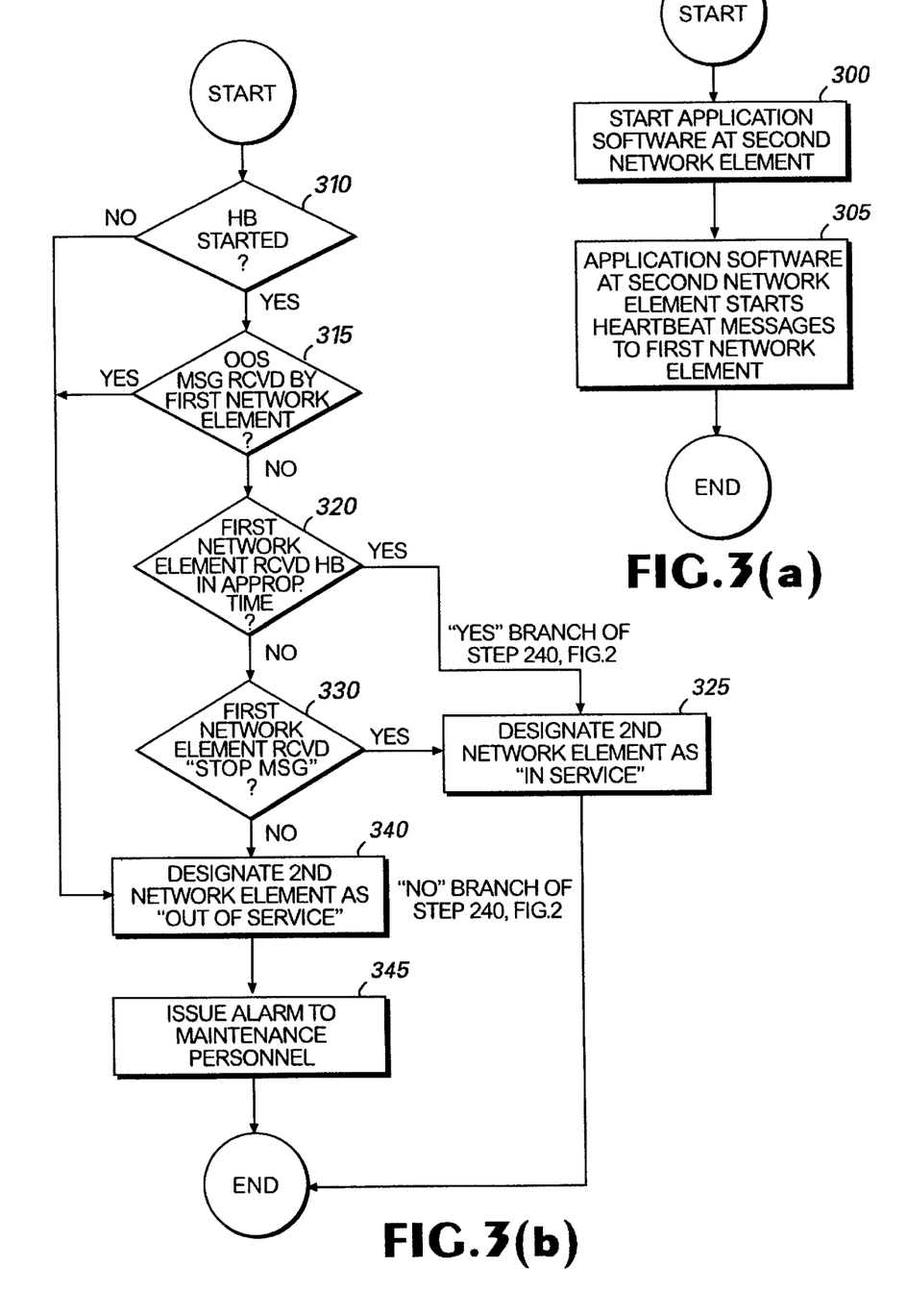
FIG. 3(a) is a flow chart illustrating the initiation of the heartbeat messages utilized by the preferred embodiment of the present invention.
FIG. 3(b) is a flow chart illustrating the preferred decision steps performed at step 240 in FIG. 2.

Preferably, as shown in FIG. 3(a), the heartbeat messages are automatically started between the SCN 50 and the SCP 42 as soon as a desired application software is executed at the SCN 50. For example, in the case of application software for a call forwarding service resident at the SCN 50, the heartbeat messages are initiated between the SCN 50 and the SCP 42 as soon as the application software is initiated for the call forwarding service at the SCN 50. Once the heartbeat messages are initiated from the SCN 50 to the SCP 42, the heartbeat messages are sent to the SCP 42 at some programmable frequency such as every thirty seconds.

Generally, if the SCN 50 is not operational, or if the X.25 network datalink 55 between the SCN 50 and the SCP 42 has failed, no heartbeat message will be sent to the SCP 42. If no heartbeat messages are sent to the SCP 42, the SCP 42 will determine a problem exists with the X.25 network or with the SCN 50. Accordingly, the SCP 42 will route calls that would normally be directed to the SCN 50 to an alternate or predetermined location. The particular application software, such application software for the call forwarding service, resident at the SCN 50, may be monitored by associated application software at the SCP 42. That is, while the SCN 50 and the X.25 network may be operational, the heartbeat messages may be utilized to inform the SCP 42 that a particular application software, such as the call forwarding service, is not operational at the SCN 50. Therefore, a call requiring some custom service such as the call forwarding service will not be routed to the SCN 50 if the particular application software is not operational for any reason.

Preferably, when the SCP 42 determines that the datalink network 55, the SCN 50, or particular application software at the SCN 50 is not operational, the SCP 42 may cause an alarm message to be generated to inform operations personnel of problems in the network.

According to the preferred embodiment of the present invention, the SCP 42 includes associated application software for each application software (to be monitored) at SCN 50. Associated application software at the SCP 42 and SCN 50 are known as "peer" applications. Therefore, through the use of heartbeat messages, as described herein, any application software at the SCN 50 may be monitored by its peer application at the SCP 42. Hereafter, reference to the SCP 42 and the SCN 50 should be understood to include reference to particular "peer" application software resident at the SCP 42 and SCN 50. It should also be understood that a single SCP 42 may be used to monitor a plurality of SCNs 50.

Once the heartbeat messages are started between the SCN 50 and the SCP 42, the heartbeat messages may be stopped by issuing a heartbeat "stop" message from the service circuit node. When the SCP 42 receives a heartbeat "stop" message, the SCP 42 assumes that SCN 50 is working properly without the receipt of subsequent heartbeat messages. By stopping the transmission messages from the SCN 50 to the SCP 42, the X.25 network datalink between the SCN 50 and the SCP 42 may be utilized for other applications. However, if the SCP 42 does not receive a "stop" message from the SCN 50, and the SCP 42 does not receive a heartbeat message at the appropriate interval, the SCP 42 will determine the SCN 50 is not operational, and the SCP 42 will designate the SCN 50 as "out of service" (OOS).

Once the SCN 50 is designated as "out of service," the SCP 42 does not route calls to the SCN 50. Instead, the SCP 42 routes the calls to a default destination, such as an alternate directory number provided by the subscriber of the custom service. If desired, the SCN 50 or particular application software resident at the SCN 50 may be manually taken out of service by issuing a manual "out of service" (OOS) message to the SCN 50. For example, the SCN 50, may be manually taken out of service for the purposes of preventive maintenance. Once the failure of the SCN 50 is corrected, a heartbeat "start" message may be issued from the SCN 50 to the SCP 42 to inform the SCP 42 that the SCN 50 or the particular application software is once again operational.

OPERATION OF THE PREFERRED EMBODIMENT

Figure 2:
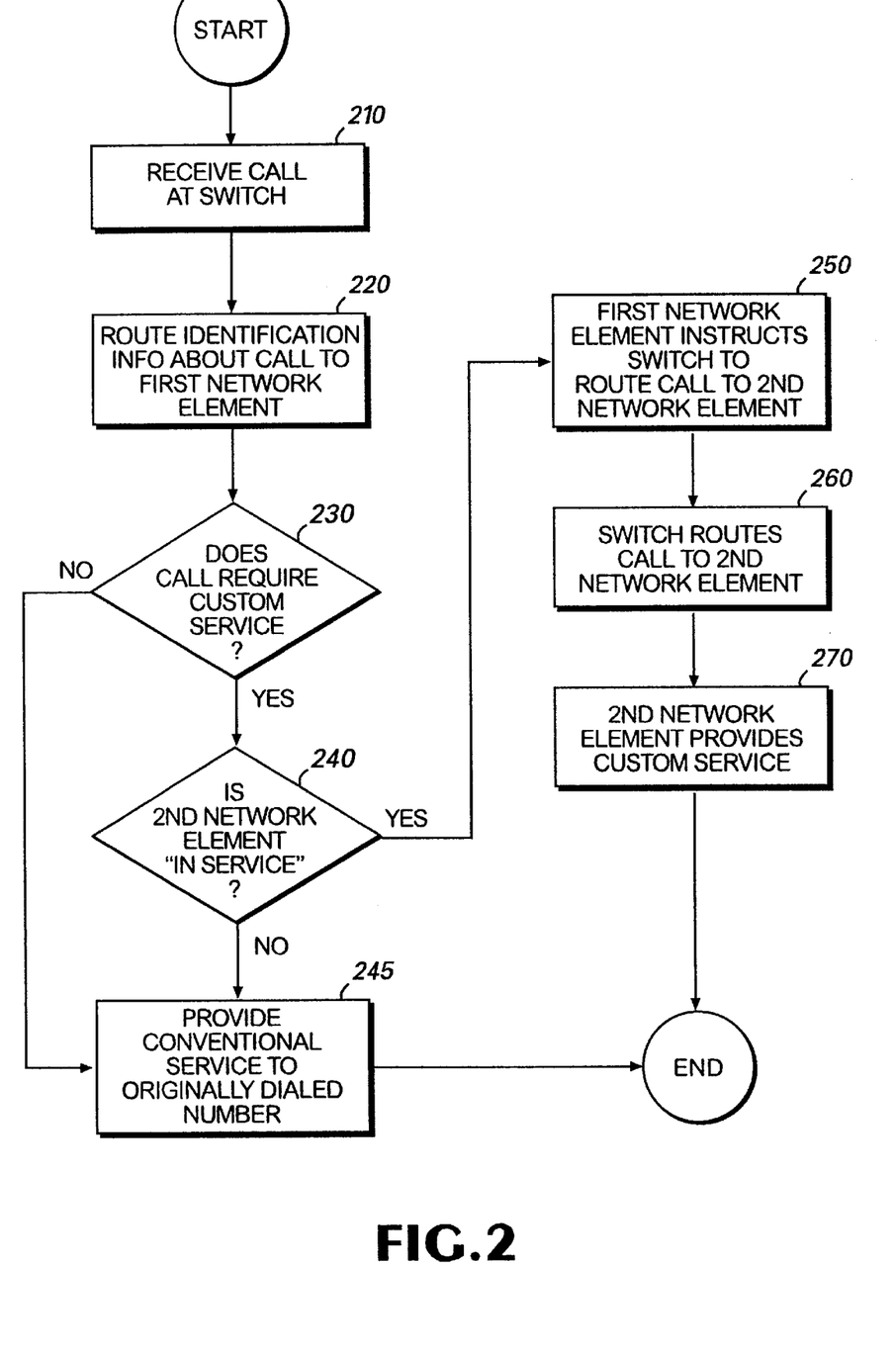
FIG. 2 is a flow chart illustrating the preferred method of the present invention.

FIG. 2 is a flow chart illustrating the preferred method of the present invention. In the preferred embodiment of the present invention, at step 210, the SSP 14, shown in FIG. 1, receives a call initiated by a calling party from telephone set 24 over line 20. At step 220, the SSP 14 formulates a query and sends the query to a first intelligent network element such as the SCP 42. At step 230, the first intelligent network element (SCP 42) determines whether the number dialed by the calling party should receive some type of custom service, such as call forwarding. If the first intelligent network element determines that no custom service is required for the directory number dialed by the calling party, the first intelligent network element instructs the SSP 14 to complete the call according to the dialed directory number. However, if the first intelligent element, at step 230, determines that the directory number dialed by the calling party requires custom service, such as the call forwarding service, the method follows the "YES" branch at step 230, and proceeds to step 240.

At step 240, the preferred method determines whether the second intelligent network element, such as the SCN 50, has been designated as "in service" or "out of service." As is discussed below, the first intelligent network element designates the second intelligent network element as "in service" or "out of service" independently of the processing of a particular call as illustrated in FIG. 2. Accordingly, at step 240, the preferred method only determines whether the second intelligent network element has been designated as "in service" or "out of service." If the first intelligent network determines the second intelligent element is "out of service," the preferred method of the present invention follows the "NO" branch, at step 240, and instructs the SSP 14 to route the call according to the dialed directory number. If the first intelligent network element determines that the second intelligent network is "in service," the preferred method of the present invention follows the "YES" branch at step 240 to step 250.

At step 250, the first intelligent network element instructs the SSP 14 to route the call to the second intelligent network element to provide the desired custom service, such as call forwarding service. At step 260, the SSP 14 routes the call to the second intelligent network element. At step 270, the second intelligent network provides the desired custom service.

Referring now to FIGS. 3(a) and 3(b), the determination performed at step 240 in FIG. 2 is discussed in detail. As shown in FIG. 3(a), heartbeat messages from the SCN 50 to the SCP 42 or from particular application software at the SCN 50 to associated application software at the SCP 42 are initiated automatically once the application software at the SCN 50 is started. It should be understood that the SCN 50 may include a plurality of application software directed to a plurality of custom services, such as the call forwarding service. It should also be understood that the initiation of the heartbeat messages at the SCN 50 is independent of the processing of a particular call, such as the call processing illustrated in FIG. 2. That is, as is discussed below, the initiation of heartbeat messages from the second intelligent network element to the first intelligent network element causes the first intelligent network element to designate the second intelligent network element as "in service" or "out of service." Accordingly, during the processing of a call requiring custom service by the second intelligent network element, as illustrated in FIG. 2, the first intelligent network element need only determine whether the second intelligent network element has been designated as "in service" or "out of service."

As shown in FIG. 3(b), the designation of the second intelligent network element as "in service" or "out of service" is made by the first intelligent network element (SCP 42) based preferably on the receipt of heartbeat messages from the second intelligent network. At step 310, the first intelligent network element determines whether the heartbeat messages have been initiated. As discussed above, the heartbeat messages preferably are initiated when a particular application software associated with the desired custom service is initiated at the second intelligent network element, as shown in FIG. 3(a). If the heartbeat messages have not been initiated, the method of the present invention follows the "NO" branch, and the first intelligent network element determines that the second intelligent network element is not operational. Accordingly, the first intelligent network element designates the second intelligent network element as "out of service." If the first intelligent network element determines at step 310 that the heartbeat messages have been initiated, the method follows the "YES" branch to step 315.

At step 315, the first intelligent network element determines whether an "out of service" message has been received by the first intelligent network element from the second intelligent element. If an "out of service" (OOS) message has been received, the first intelligent network element follows the "YES" branch at step 315 to step 340 and designates the second intelligent network element as "out of service." If the first intelligent network element determines that an "out of service" message has not been received, the method follows the "NO" branch at step 315 to step 320.

At step 320, the first intelligent network element determines whether a heartbeat message has been received at the appropriate interval, as discussed above. If the established period between heartbeat messages has not been exceeded since the last heartbeat message was received by the first intelligent network, the method follows the "YES" branch at step 320 to step 325. The first intelligent network element determines the second intelligent network element is operational, and accordingly, the first intelligent network element designates the second intelligent network element as "in service."

If, at step 320, the first intelligent network element determines that the designated period between heartbeat messages has been exceeded since the last heartbeat message received by first intelligent network, the method follows the "NO" branch, at step 320, to step 330. At step 330 the first intelligent network element determines whether it has received a heartbeat "stop" message from the second intelligent network element.

As discussed above, the second intelligent network element may issue a heartbeat "stop" message to the first intelligent network element. If the first intelligent network element receives a heartbeat "stop" message, the first intelligent network element assumes that the second intelligent element and any associated application software are operational. Consequently, the first intelligent network element designates the status of the second intelligent network element as "in service" until it receives an "out of service" (OOS) message from the second intelligent network element. Accordingly, if the first intelligent network element has received a heartbeat "stop" message and has not received an "out of service" message, the first intelligent network element, at step 330, follows the "YES" branch to step 325, and the first intelligent network element designates the second intelligent network element as "in service." If, at step 330, the first intelligent network element has not received a heartbeat "stop" message, the first intelligent network element follows the "NO" branch to step 340. The first intelligent network element determines the second intelligent network element is not operational, and the first intelligent network element designates the second intelligent network element as "out of service."

At step 345, if desired, the first intelligent network element may generate an alarm to inform maintenance personnel of the "out of service" second intelligent network element.

EXAMPLE

The method and system of the preferred embodiment of the present invention are best illustrated by showing, as an example, how the method and system processes a call which requires forwarding treatment by the service circuit node (SCN 50) as part of a call forwarding system.

Figure 4:
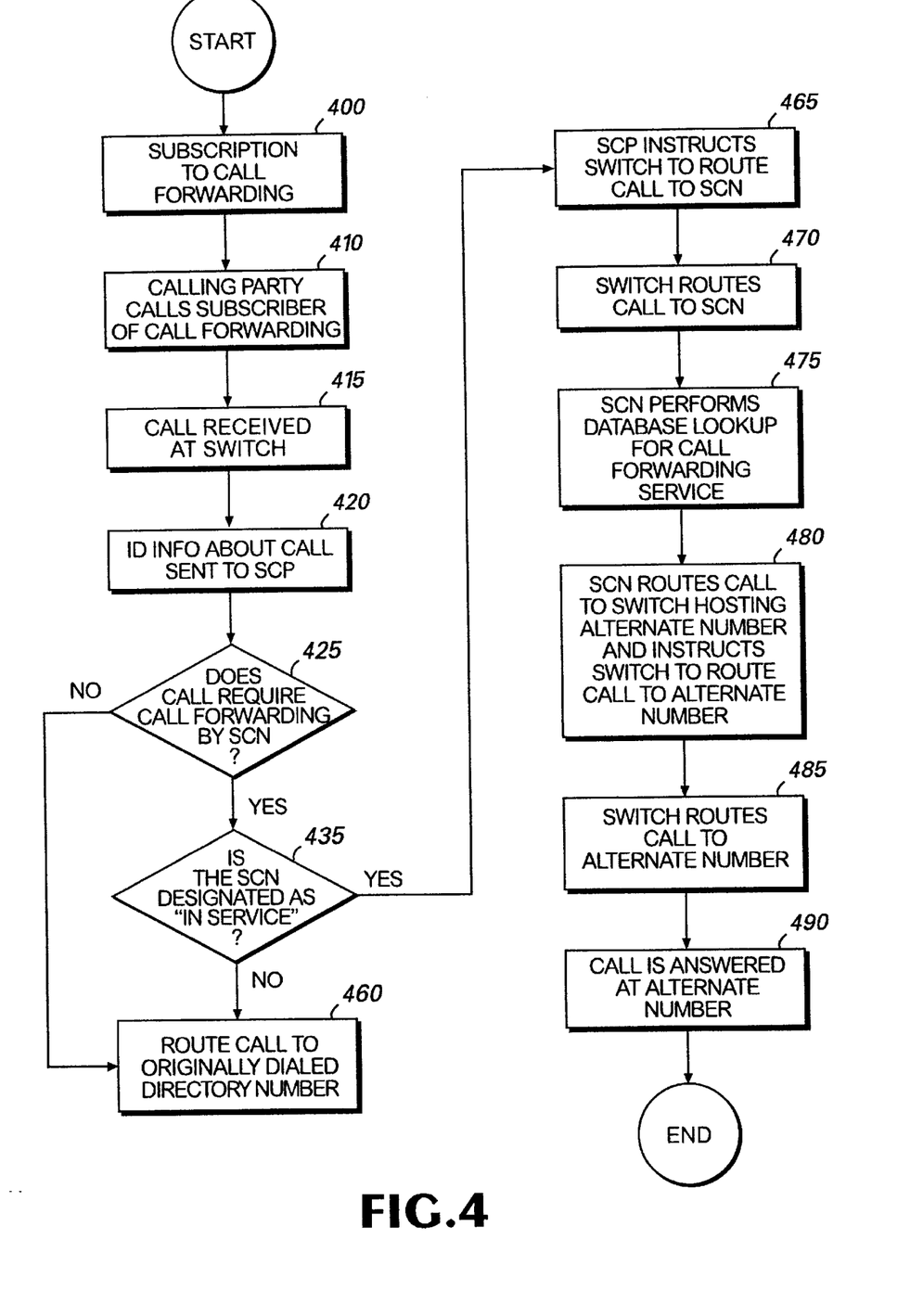
FIG. 4 is a flow chart illustrating an exemplary operation of the preferred method of the present invention.

Referring now to the drawings, FIG. 4 is a flow chart showing the steps performed in the preferred embodiment of the present invention in handling a call directed to a telephone directory number requiring call forwarding treatment. In the present example, at step 400, Ms. Price, a subscriber of call forwarding services, orders that calls directed to her home telephone directory number be temporarily forwarded to the home telephone directory number of Mr. Chan.

Referring now to FIGS. 1 and 4, at step 410 a calling party, Mr. Ven, dials Ms. Price's home telephone directory number from telephone set number 24 in order to speak with Ms. Price. At step 415, the call placed by Mr. Ven is received at SSP/central office switch 14. At step 420, the SSP 14 formulates and sends a query to the SCP 42 via STP 34. As is well known to those skilled in the art, a query sent to the SCP 42 contains identification information corresponding to the call initiated by Mr. Ven.

At step 425, the SCP 42 in response to the query from the SSP 14, reads the identification information sent by the SSP 14 and performs a database lookup to determine whether the call requires any type of custom service treatment. If the SCP 42 determines the call does not require any type of custom service treatment, the method follows the "NO" branch at step 425 to step 460 and the SCP 42 instructs the switch to continue the call conventionally according to the directory number dialed by Mr. Ven. In the present example, the SCP 42 determines from the query sent by the SSP 14 that the directory number dialed by Mr. Ven has been designated for custom service treatment, namely call forwarding to the alternate directory number of Mr. Chan as designated by the subscriber of the call forwarding service, Ms. Price.

As discussed in detail above, in order to provide the call forwarding service to the call initiated by Mr. Ven, the SCP 42 routes the call to the SCN 50 to provide the call forwarding service. According to the preferred embodiment of the present invention, the SCP 42 first determines whether the SCN 50 is operational prior to routing the call to the SCN 50 for custom service treatment. At step 435, the SCP 42 determines whether the SCN 50 is operational based on whether the SCN 50 has been designated as "in service" or "out of service." The preferred method's designation of the SCN 50 as "in service" or "out of service" is illustrated in FIGS. 3(a) and 3(b) and is discussed above. If, at step 435, the SCP 42 determines the SCN 50 is "out of service," the method follows the "NO" branch to step 460.

Accordingly, at step 460, the SCP 42 instructs the SSP 14 to continue the call to Ms. Price's home telephone directory number as dialed by Mr. Ven. As should be understood, this step causes Mr. Ven's call to be placed to the home telephone directory number of Ms. Price notwithstanding Ms. Price's order that calls directed to her home telephone number be forwarded to the home telephone directory number of Mr. Chan. This step represents a default treatment of the call to the originally dialed directory number. Advantageously, this default treatment prevents the call from being lost altogether by sending it to an "out of service" network element (in this case the SCN 50). It should be understood that this default treatment routes the call around the "out of service" network element. It should be understood that another directory number may be selected as a default number.

If the SCP 42 determines that the SCN 50 has been designated as "in service," the method follows the "YES" branch to step 465. At step 465, the SCP 42 instructs the SSP 14 to route the call to the SCN 50 for call forwarding service treatment. At step 470, the SSP 14 routes the call to the SCN 50. At step 475, the SCN 50 performs a database lookup to determine what custom service treatment is required for the directory number dialed by Mr. Ven. As a result, the SCN 50 determines that the calls directed to the directory number originally dialed by Mr. Ven have been designated for call forwarding service. In the present example, the SCN 50 determines that the directory number originally dialed by Mr. Ven is to be forwarded to the home telephone number of Mr. Chan. Accordingly, at step 480, the SCN 50 routes the call to SSP/central office switch 12 and instructs SSP 12 to route the call to the home telephone directory number to Mr. Chan as ordered by Ms. Price. It should be understood that the SCN 50 routes the call to the switch that hosts the alternated directory number. In present example the switch hosting the alternate number is SSP 12. At step 485, the SSP 12 routes the call to the home telephone directory number of Mr. Chan over line 18 to telephone set 21. At step 490, Mr. Chan answers telephone set 21 and hears Mr. Ven ask for Ms. Price.

Advantageously, the preferred embodiment of the present invention provides a method and system for monitoring the operational status of intelligent network elements of an advanced intelligent network system by utilizing heartbeat messages between intelligent network elements. Thus, the present invention provides for the efficient use of intelligent network elements and prevents unnecessary forwarding of calls to non-operational network elements. While this invention has been described in detail with particular reference to the preferred embodiments thereof, it will be understood the variations and modifications can be affected within the spirit and scope of the invention as described herein and as defined in the appended claims.

What is claimed is:

1. In an intelligent switched telecommunications network, including a plurality of network elements for processing telephone communications, a method of monitoring the operational status of a network element prior to routing a call to that network element for custom service, comprising the steps of:

receiving a call at a switch;

causing said switch to route identification information corresponding to said call to a service control point;

causing said service control point, in response to receipt of said identification information, to determine whether said call requires said custom service from a second network element;

if said service control point determines that said call requires said custom service from said second network element, then causing said service control point to determine whether said second network element is operational by determining the status of a heartbeat message;

if said service control point determines said second network element is operational, then causing said service control point to provide instructions to said switch to route said call to said second network element to receive said custom service; and if said service control point determines said second network element is not operational, then causing said service control point to provide instructions to said switch to route said call around said second network element to a default destination.

2. The method of claim 1, wherein said step of determining the status of a heartbeat message, further comprises the steps of:

causing said second network element to send said heartbeat message to said service control point;

receiving said heartbeat message at said service control point from said second network element;

in response to receipt of said heartbeat message, causing said service control point to determine that said second network element is operational;

in response to a failure to receive said heartbeat message, causing said service control point to determine that said second network element is not operational;

if said service control point determines said second network element is not operational, then causing said service control point to designate said second network element as "out of service;"

if said service control point determines said second network element is operational, then causing said service control point to designate said second network element as "in service."

3. The method of claim 1, wherein said second network element is an advanced intelligent network (AIN) service circuit node, and wherein said step of causing said service control point to determine whether said second network element is operational further comprises causing said service control point to determine whether said AIN service circuit node is operational.

4. The method of claim 1, wherein said second network element is an automatic call distributor, and wherein said step of causing said service control point to determine whether said second network element is operational further comprises causing said service control point to determine whether said automatic call distributor is operational.

5. The method of claim 1, wherein said second network element is a private branch exchange, and wherein said step of causing said service control point to determine whether said second network element is operational further comprises causing said service control point to determine whether said private branch exchange is operational.

6. In an advanced intelligent network, including a switch, a service control point, and a service circuit node, a method of monitoring the operational status of said service circuit node prior to routing a call to said service circuit node for a custom service, comprising the steps of:

receiving a call at said switch;

causing said switch to route identification information corresponding to said call to said service control point;

causing said service control point, in response to receipt of said identification information, to determine whether said call requires said custom service from said service circuit node;

if said service control point determines that said call requires said custom service from said service circuit node, then causing said service control point to determine whether said service circuit node is operational, by determining the status of a heartbeat message;

if said service control point determines said service circuit node is operational, then causing said service control point to provide instructions to said switch to route said call to said service circuit node to receive said custom service; and if said service control point determines said service circuit node is not operational, then causing said service control point to provide instructions to said switch to route said call around said service circuit node to a default destination.

7. In an intelligent switched telecommunications network, including a plurality of network elements for processing telephone communications, a method of monitoring the operational status of a network element, comprising the steps of:

receiving a heartbeat message at a service control point from a second network element;

causing said service control point, in response to receipt of said heartbeat message, to determine whether said second network element is operational;

if said service control point determines said second network element is operational, then causing said service control point to designate said second network element as operational;

if said service control point determines said second network element is not operational, then causing said service control point to cause a telephone communication requiring processing by said second network element to be routed to a default destination; and in response to said service control point designating said second network element as operational, causing said service control point to cause the telephone communication requiring processing by said second network element to be routed to said second network element for processing.

8. In an intelligent switched telecommunications network, including a plurality of network elements for processing telephone communications, a system of monitoring the operational status of a network element prior to routing a call to that network element for custom service, comprising:

a switch operative to receive a call;

a service control point being functionally connected to said switch and being functionally connected to a second network element, said service control point being operative to receive identification information corresponding to said call, to determine whether said call should receive custom service from said second network element, to determine whether said second network element is operational by determining the status of a heartbeat message, to provide instructions to said switch to route said call to said second network element if said service control point determines said second network element is operational, and to provide instructions to said switch to route said call to a default destination if said service control point determines that said second network element is not operational;

said switch being further operative to route said call to said second network element; and said second network element being operative to provide custom service to said call.

9. The system of claim 8, wherein said second network element is an advanced intelligent network service circuit node.

10. The system of claim 8, wherein said second network element is an automatic call distributor.

11. The system of claim 8, wherein said second network element is a private branch exchange.

* * * * *